United States Patent
Janka et al.

(10) Patent No.: US 7,624,596 B2
(45) Date of Patent: Dec. 1, 2009

(54) METHOD FOR THE PREPARATION OF DOPED OXIDE MATERIAL

(75) Inventors: Kauko Janka, Tampere (FI); Markku Rajala, Helsinki (FI)

(73) Assignee: Liekki Oy, Lohja (FI)

( * ) Notice: Subject to any disclaimer, the term of this patent is extended or adjusted under 35 U.S.C. 154(b) by 439 days.

(21) Appl. No.: 10/518,006

(22) PCT Filed: Jun. 27, 2003

(86) PCT No.: PCT/FI03/00522

§ 371 (c)(1),
(2), (4) Date: Dec. 14, 2004

(87) PCT Pub. No.: WO2004/002907

PCT Pub. Date: Jan. 8, 2004

(65) Prior Publication Data
US 2005/0241341 A1   Nov. 3, 2005

(30) Foreign Application Priority Data
Jun. 28, 2002   (FI)   ................................. 20021269

(51) Int. Cl.
*C03B 37/027*   (2006.01)
(52) U.S. Cl. .............................. 65/390; 65/413; 65/421; 65/531
(58) Field of Classification Search .................. 65/413, 65/421, 531, 390
See application file for complete search history.

(56) References Cited

U.S. PATENT DOCUMENTS

| | | | | |
|---|---|---|---|---|
| 3,698,936 A | * | 10/1972 | Moltzan | 427/452 |
| 3,737,292 A | * | 6/1973 | Keck et al. | 65/421 |
| 4,212,663 A | * | 7/1980 | Aslami | 65/488 |
| 4,278,458 A | | 7/1981 | O'Connor et al. | |
| 4,336,049 A | * | 6/1982 | Takahashi et al. | 65/390 |
| 4,501,602 A | * | 2/1985 | Miller et al. | 65/390 |
| 5,043,002 A | * | 8/1991 | Dobbins et al. | 65/386 |
| 5,059,230 A | * | 10/1991 | Mollenauer et al. | 65/390 |
| 5,188,648 A | * | 2/1993 | Geittner et al. | 65/391 |
| 5,260,816 A | * | 11/1993 | Edagawa et al. | 359/341.3 |
| 5,961,682 A | * | 10/1999 | Lee et al. | 65/384 |

(Continued)

FOREIGN PATENT DOCUMENTS

JP      59131537 A      7/1984

(Continued)

OTHER PUBLICATIONS

Office action issued Jun. 9, 2009 in counterpart Japanese patent application 2004-516824.

*Primary Examiner*—John Hoffmann
(74) *Attorney, Agent, or Firm*—Venable LLP; Eric J. Franklin

(57) ABSTRACT

A method for preparing doped oxide material, in which method substantially all the reactants forming the oxide material are brought to a vaporous reduced form in the gas phase and after this to react with each other in order to form oxide particles. The reactants in vaporous and reduced form are mixed together to a gas flow of reactants, which gas flow is further condensated fast in such a manner that substantially all the component parts of the reactants reach a supersaturated state substantially simultaneously by forming oxide particles in such a manner that there is no time to reach chemical phase balances.

11 Claims, 2 Drawing Sheets

U.S. PATENT DOCUMENTS 6,079,225 A * 6/2000 Ruppert et al. ............... 65/17.2
2002/0005051 A1 1/2002 Brown et al.

FOREIGN PATENT DOCUMENTS

| | | | |
|---|---|---|---|
| JP | 6283324 A | 4/1987 | |
| JP | 5105471 A | 4/1993 | |
| WO | WO 0020346 A1 | 4/2000 | |

* cited by examiner

METHOD FOR THE PREPARATION OF DOPED OXIDE MATERIAL

FIELD OF THE INVENTION

The invention relates to a method for the preparation of a doped oxide material.

An important usage of doped glass materials is light amplification waveguides, for example active optical fibres, whose light amplifying properties are based on utilizing stimulated emission. In order to make stimulated emission possible, the glass material in the core of the active optical fiber, and possibly the cladding layer surrounding the core, are doped with dopants, which are rare earth metals, for example erbium. In addition to optical fibers, the doped glass materials can also be used in different kinds of optical planar waveguides.

BACKGROUND OF INVENTION

The active optical fibers are prepared by drawing glass into optical fiber from a fiber preform, which fiber preform can be created in several different ways. A generally used manner for preparing a fiber preform is to grow glass material around a mandrel, or a corresponding substrate arranged to rotate, by flame hydrolysis deposition, FHD. When the above-mentioned growing is performed from the outer periphery of the fiber preform, it is often in this connection referred to as a so-called OVD method (outer vapour deposition). The FHD method is also applied in forming glass layers required in optical planar waveguides on a planar substrate.

In the FHD method, a hydrogen-oxygen flame is typically used as a thermal reactor, and the glass forming base materials used in the preparation of glass material, for example silicon or germanium tetrachloride, are directed to the burner and the flame typically in a vapour form. The dopants of glass material, such as, for example, erbium, are directed to the burner and the flame typically with carrier gas as vapour or aerosol droplets, which are formed of the liquid containing dopants correspondingly either by vaporizing or by spraying.

Alternatively, according to the solution developed by the applicant, the dopants can be directed all the way to the burner in liquid form and be atomised as aerosol droplets, for example by using hydrogen flow, not until in the immediate vicinity of the flame. This method, which is described more in detail, for example, in the applicant's earlier publication WO 00/20346 and which can be considered a further development of the conventional FHD method, is later referred to as liquid flame spraying.

In the flame functioning as a thermal reactor in the FHD or liquid flame spraying method, the base materials and dopants further form aerosol particles, which aerosol particles are guided onto the substrate to be coated, thus forming a doped porous glass material coating. These aerosol particles are often in literature referred to as "glass soot" in English. When a suitable coating layer of porous glass material has been grown on the mandrel or other substrate, the above-mentioned coating layer is sintered into a dense glass by heat-treating the substrate at an appropriate high temperature.

A so-called solution doping method is also known, in which method a fiber preform grown of only base materials is dipped into a solution containing dopants only after growing the fiber preform, before sintering.

Rare earth metals dissolve poorly into quartz glass and require that, for example, the structure of $SiO_2$-based glass is changed by adding an appropriate oxide to the glass. Oxides suitable for the purpose are, for example, $Al_2O_3$, $La_2O_3$, $Yb_2O_3$, $GeO_2$ or $P_2O_5$. Preferably this oxide is aluminium oxide $Al_2O_3$, which at the same time increases the refractive index of the glass.

When doping the core of optical fiber (or other waveguide) with a rare earth metal, an increase in the refractive index of the core in relation to the cladding layer is achieved at the same time by means of the aluminium oxide, which is necessary in order for the operating principle of the optical fiber to materialize. In the liquid flame spraying method of the applicant, the aluminium is added by atomising aluminium chloride dissolved in a suitable liquid to the flame. Liquids suitable for the purpose are, for example, water, organic solvents, such as ethanol, methanol, acetone, or mixtures of the above. Correspondingly, nitrate or chloride based sources dissolved in a liquid are used for rare earth metals, such as erbium.

In the growing that takes place by means of the methods described above, when silicate/alumina glass are doped with rare earth metals, one problem is the inhomogeneous distribution of dopants into aerosol particles forming glass coating. This is caused by e.g. the tendency of dopants to form pairs. In a chemical balance, erbium does not dissolve in said materials as individual ions separate from each other. In a gas phase erbium aims to oxidize into form $Er_2O_3$ and in a solid phase erbium aims typically to a phase system $Al_5Er_3O_{12}+Al_2O_3$ with aluminium. In other words, with aluminium erbium aims to occur clustered in its own phases. Even though the situation in a glass-like silica/alumina system is more complex than described above, the above discussion offers a good impression on how erbium acts.

Especially when using the liquid flame method, most of aluminium and a majority of erbium aims to remain in the solid residual particle, which is created from a liquid aerosol droplet when it "dries" in the flame, and wherein the above-mentioned oxidation of materials into glass forming oxides takes place. Because of this, the fiber preform forming in the process typically includes at least two types of glass soot particles. Firstly, small Si-containing (or Ge-containing) particles, which are formed via condensation from vaporous base materials and the evaporation/drying following it. Secondly, aluminium and erbium containing residual particles, which are typically larger than these Si-particles. Because of these different types of particles, there is a crystallizing tendency in the glass material when it is sintered.

During sintering, a part of the crystals may also melt, which improves the homogeneity of the glass material. However, there is the risk that remaining dopants, especially in the larger residual particles, do not even then dissolve completely in the glass, in which case, when examined on the small scale, the consequence is that the dopants are locally inhomogeneously parted in the glass material. This weakens the light amplifying properties of the glass.

On the other hand, in the case of a, for example, silicon wafer based planar waveguide, the temperatures used in sintering are more limited than in the case of a fiber preform meant for optical fiber. Thus, unwanted crystals causing scattering unavoidably remain in the ready glass coating even after sintering and because of the inhomogeneous composition of the glass material also the light amplifying properties of glass are unideal.

In all such processes, wherein glass soot particles and especially particles containing dopants are not created substantially directly by condensation via a gas phase, but larger liquid aerosol droplets are an intermediate phase, a problem is that different impurities also remain (encapsulate) in the residual particles forming from aerosol droplets.

SUMMARY OF THE INVENTION

It is the main aim of the present invention to present a completely new method for producing doped oxide material, with which method the above-described problems occurring in the processes according to prior art are avoided.

With the method according to the invention, it is possible to produce different oxide materials. For example, it is possible to produce multicomponent oxide materials, wherein there are several reactants, whose respective parts are substantially equal respectively, such as, for example, bariumtitanate (Ba-TiO$_3$).

The method can also be used in producing such multicomponent oxide materials, wherein there are several reactants, whose respective portions are of substantially different sizes respectively, such as, for example, piezoelectric PZT (Pb(Zr$_{1-x}$Ti$_x$)O$_3$), which has a high dielectric constant. (In the formula the parameter x determines the ratio of zircon and titanium, and a typical value is, for example, 0.45).

With the method according to the invention, it is also possible to produce so-called doped oxide materials, wherein there are larger portions of base materials and smaller portions of dopants, such as, for example, titanium oxide (TiO$_2$) doped with molybdenum (Mo), as well as some doped glass materials.

The aim of the invention is thus to make it possible to prepare doped oxide material, which is more equal in quality than before, in which oxide material the composition is on the micro level more homogeneous than before and wherein the crystal structure is as desired. The different kind of properties of oxide material become more optimal than before with the invention, in which case it is possible to manufacture better products than before from the oxide material.

The aim of an embodiment of the invention is to make it possible to prepare doped glass material, which is more equal in quality than before, in which glass material there is no harmful crystallization and the composition of the glass is also on the micro level more homogeneous than before. In glass material formed in this manner, there is thus less unwanted light scattering, which scattering causes attenuation/loss of light in the light guides prepared from the glass material in question. The light reinforcing properties of the glass material also become more optimal than before with the invention, in which case it is possible to manufacture better active light guides than before from the glass material, for example active optical fibers.

A substantial basic idea of the invention can be considered to be that all the reactants required in the preparation of doped oxide material, both the base materials and dopants are first brought to a vaporous form, i.e. a gas phase. Condensation of reduced components from the gas phase to a liquid phase is performed extremely fast in such a manner that all components contained in the reactants and required in forming doped material are brought substantially simultaneously to a supersaturated state, in which case the composition of liquid droplets forming in this manner and solid particles forming immediately from them is made very homogeneous. The homogeneous composition of particles refers here to that, first of all, different particles have the same composition respectively, but also that the local inner composition of an individual particle is homogeneous, i.e. in an individual particle all the components are equally divided over the entire volume of the particle.

According to the invention, the above-mentioned fast condensation of the components of the reactants is achieved either by fast oxidation of reactants and/or by fast adiabatic expansion of the gas flow of the reactants.

The conditions according to the invention are arranged so that the particles also solidify immediately after condensation, in which case there is no time to reach chemical phase equilibrium.

By means of the invention, it is possible to prepare a doped oxide material, such as, for example, doped glass material, to be more homogeneous in its composition than before, in which case, for example, in glass materials amplifying light and doped with rare earth metals, the amplifying properties can be optimised better than in prior art. When using, for example, erbium as a dopant, it is possible by means of the invention to prevent erbium from clustering, and erbium can be brought to distribute more smoothly over the glass material, preferably as individual ions. In the case of silico-based planar waveguides, the problems resulting from crystallization of glass material and the unwanted scattering properties resulting from crystallization are avoided. Further, by means of the invention it is possible to avoid such impurities, which in the processes according to prior art tend to capsulate in the inner parts of the residual particles.

The invention and some of its advantageous embodiments are described more in detail in the following, where it will also become more clear to a man skilled in the art what the advantages reached with the invention are. The doped oxide material produced in the embodiment according to the example presented by means of the figures is a doped glass material, and on the basis of the description connected to it, a man skilled in the art can apply the invention also in producing other doped oxide materials by possibly implementing minor changes in the embodiment according to the example.

All the reactants required in the preparation of doped glass material according to the invention, both the base materials (for example Si or Ge) and dopants (for example Al and rare earth metals) are in the beginning brought to a vaporous form i.e. the gas phase, by appropriately increasing the temperature of said materials and by choosing an appropriate chemical composition for each reactant. Heating the reactants can be implemented with any manner apparent as such to a man skilled in the art. For example, silicon tetrachloride SiCl$_4$ can be used as the base material of glass material and aluminium and erbium as the dopant, the latter either as nitrates or chlorides. The compounds used as the sources of aluminium and erbium can be, for example, dissolved in appropriate liquids and evaporated further to a gas phase by heating the solutions in question. In conveying the reactants brought to the gas phase, it is possible to utilize appropriate carrier gases.

The base materials and dopants in a gaseous or reduced form are next guided mixed together or still as separate gas flows B, D to the reactor R functioning as a flow channel by at the same time retaining their temperature such that the base materials and dopants B, D remain in a vaporous form. The ratio between the base materials and dopants can be adjusted by changing the ratio of the gas flows B, D, for example, by means of adjustable valves, such as mass flow controllers, or some other appropriate manner.

In reactor R the gas flow B of base materials and the gas flow D of dopants is mixed (in FIG. 1 at point M) together by combining them as the gas flow BD of reactants. Alternatively, combining and mixing the gas flows B, D can have been performed already before the reactor R. It is obvious to a man skilled in the art that the pipelines and the like conveying the gas flows, B, D, BD, as well as the walls of reactor R are advantageously warmed in order to prevent the reactants from significantly condensing on their walls.

Figure 1:
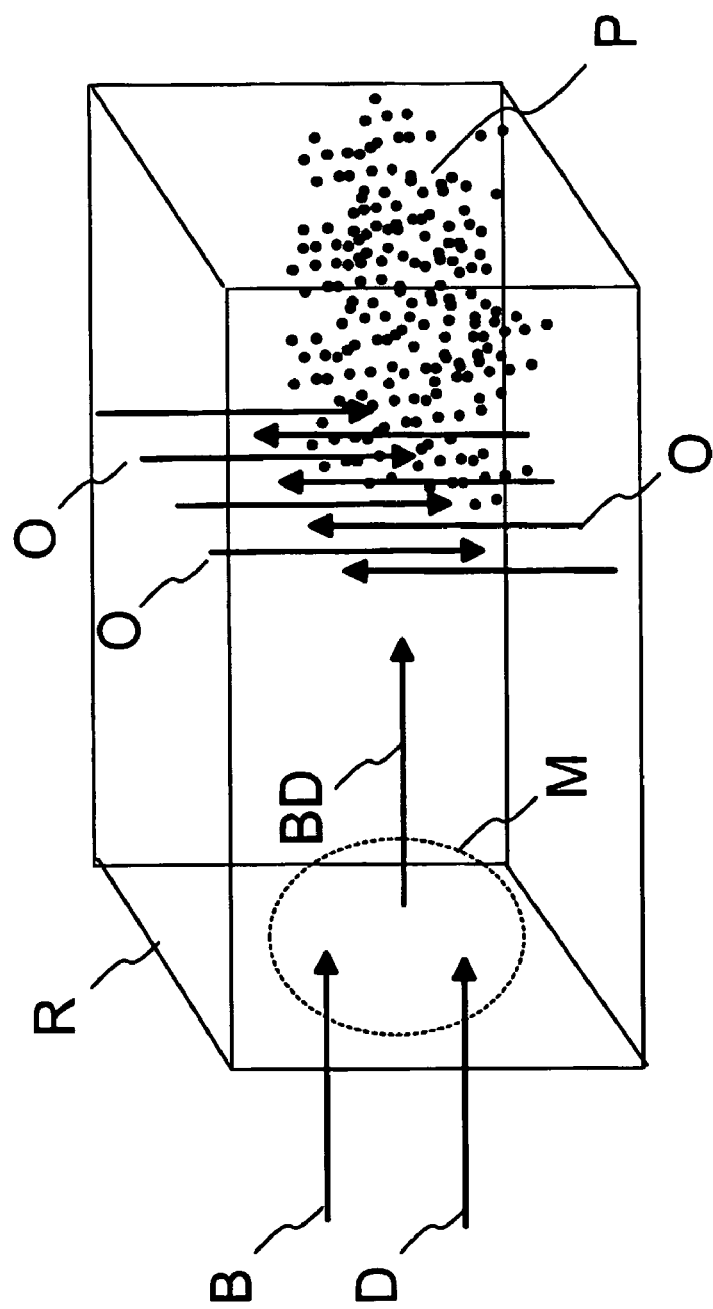
FIG. 1 shows, in principle, a structure of a reactor according to the invention in a perspective view.

Instead of the conventional heated pipelines and combining nozzles placed in the oven-like reactor R according to FIG. 1 or corresponding solutions obvious to a man skilled in the art, it is possible to use plasma gas created, for example, by means of electric arc, in which plasma gas functioning as a carrier gas the gas flows of the base materials and dopants are mixed, in heating and mixing the gas flows B, D of the base materials and dopants.

According to an embodiment of the invention, the hot gases/vapours of the gas flow BD, which are mixed together and in a reduced form in the reactor R, are oxidized and thus at the same time condensated very fast into oxides forming glass material. Oxidation/condensation is performed in such a temperature, wherein a multiple supersaturated state is formed to all reactants. Thus the condensation takes place instantaneously so that when all the reactant and dopant components are in a supersaturated state, droplets are formed as a result of condensation and instantaneously further glass particles P, whose mutual and inner composition is homogeneous. The inner homogeneous composition of the particles P refers here to that the different components are equally divided in relation to the entire volume of the particles without layered or other type of locally inhomogeneous structures. The ratio of the concentrations of the reactants in the particles is determined substantially according to what the ratio of the concentrations of the reactants was in the gas phase in the gas flow BD before condensation.

It is clear to a man skilled in the art that because the material is a glass-like material, which has no clear melting or solidification temperature, the term "condensation" should here be understood widely. In other words, depending on the situation, either a liquid or solid glass particle can be understood to form as a result of condensation.

In order to understand the embodiment of the invention described above, it is important to note that the saturated vapour pressure of the oxidized forms of the reactants, in a certain temperature being examined, is significantly lower than in connection with corresponding reduced forms. Because of this, the fast condensation of the reactants in the gas phase can be performed by mixing fast oxidative gases to the gas flow of the reduced reactants.

Figure 2:
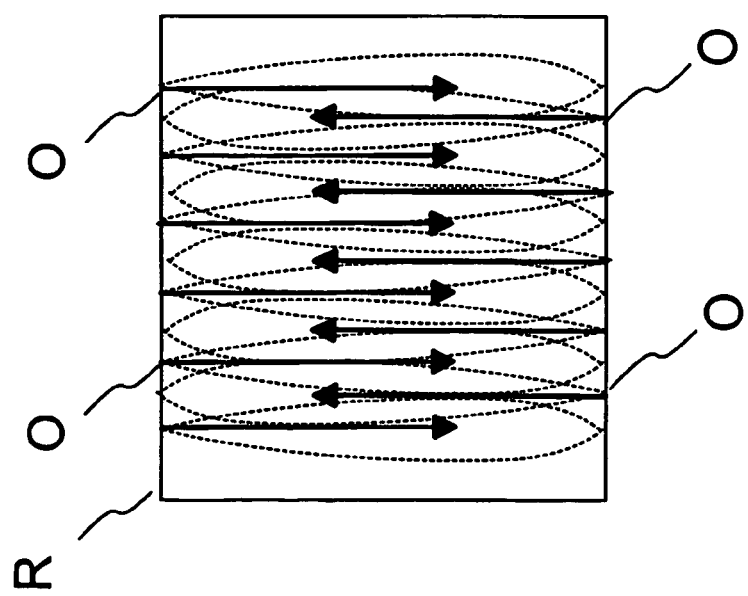
FIG. 2 shows, in a principle view, a cross section of the reactor according to the invention.

According to the advantageous embodiment of the invention presented in FIG. 1, the condensation/oxidation is performed by conducting intensive jets O of oxidative gases to the reactor, which jets are advantageously located transverse to the gas flow BD of the reactants. Preferably, jets O of oxidative gases are further located on the two opposite walls of the reactor according to FIG. 2 in such a manner that the gas jets O, which are opposite and adjacent in the cross-direction of the reactor, are located overlapping each other. This intensifies the turbulence created by the jets O of oxidative gases to the gas flow BD of the reactants, which turbulence mixes the oxidative gases O and the reactant gases BD effectively together. Jets O of oxidative gases can also be arranged onto more walls of the reactor R, or they can be directed in some other manner promoting turbulence and mixing in relation to the gas flow B, D of reactants.

For example, oxygen or carbon dioxide can be used as oxidative gases. Oxidative gases O can, when entering the reactor, be in the same temperature as the reactant gases in their reduced form, in other words hot. Thus, the condensation is mainly caused by the change in the vapour tension experienced by the reactants when they oxidize to oxides. Advantageously the oxidative gases are, however, "cold", which intensifies and accelerates the condensation.

In the reactor R there have been arranged such conditions, wherein the oxidation of reactants BD can take place in reaction temperatures, which are typically around 1000-2000° C. In these temperatures, the progress of chemical reactions is determined by the mixing rate of gases. In practice, when the gas flow BD of reactants meets the jets O of oxidative gases in the reactor R, the oxidation takes place in the mixing zones (reaction zones) forming on the junctions between these gas flows, the "thickness" of which zones is typically around a few millimetres. The reactor R can be used in normal pressure, but in order to intensify the reactions, the pressure of the reactor, the flow rate or the reactants and oxidative gases, as well as the temperature of the reactor can be adjusted in order to optimise the process.

Figure 3:
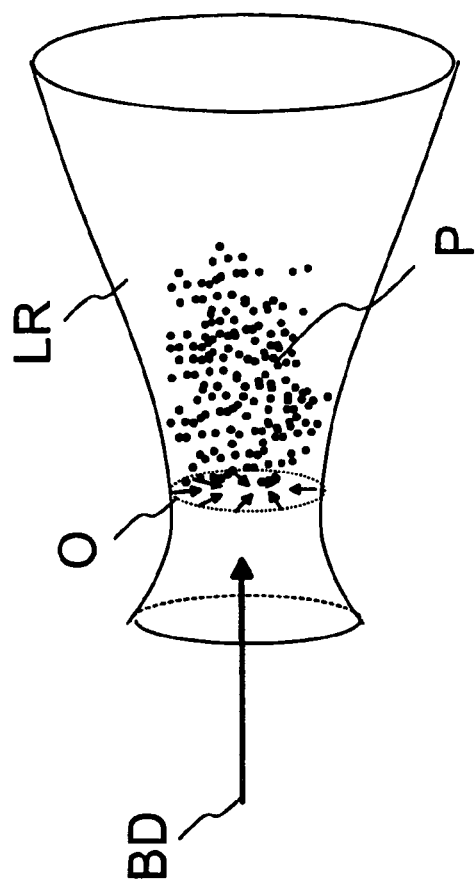
FIG. 3 shows, in a principled side-view, another reactor according to the invention.

In an embodiment of the invention shown in FIG. 3 in principle, condensation is induced by means of adiabatic expansion of the gas flow BD of reactants. In other words, the gas flow BD of reactants is directed, for example, through a so-called Lavall nozzle LR, well known as such. In the Lavall nozzle LR functioning as a flow channel and a reactor, the gas flow BD can be accelerated to supersonic velocity. The oxidative gases O required in the oxidation of reduced reactants can be directed to the gas flow BD of reactants, for example, in the narrowest part of the nozzle LR, in which case the turbulence caused by the expansion of gases will intensify the mixing of gases. It must be noted that in FIG. 3 the form of the Lavall nozzle LR shown for the purposes of illustration does not necessarily correspond to the exact shape of the nozzle used in reality.

When using adiabatic expansion, a high velocity for particles P is reached as an additional advantage, which can be utilized in intensifying the collection of particles onto the substrate by utilizing impaction mechanism.

With an appropriate selection of oxidative gases it is possible to prevent impurities from condensing and ending up in particles. For example, different kind of mixtures of carbon monoxide, carbon dioxide and water can be used as oxidative gases.

The structure of the reactor R, LR can be oven-like in such a manner that the walls of the reactor are heated. Advantageously, materials resistant to high temperatures, such as quartz, are used as the material of the reactor. The walls of the reactor can be partly or entirely porous, in which case, for example, different kinds of shielding gases can be directed through the walls inside the reactor. The shape of the cross section of the flow channel formed by the reactor R, LR can be a rectangle, circle, or some other shape appropriate for the purpose.

When forming doped glass materials, it is also possible to use chlorine-free reactants, such as TEOS (tetraethylortosilicate) or GEOS (tetraethoxygermanium) in an appropriate form as base materials B. In addition to the ones mentioned above, it is possible to use also other rare earth metals and lantanides as dopants D, such as, for example, neodymium, and further also phosphorus, boron and/or fluorine.

The glass particles formed by using the method according to the invention can be collected according to prior art onto an appropriate substrate, for example, around a rotating mandrel or on a planar substrate, on which surface is thus formed a porous glass layer, which can in later stages of process be sintered into a compact glass layer. The glass particles can, however, also be collected by other means, for example as dusty powder, which can later be used as desired in preparing glass components.

It is, of course, obvious for anyone skilled in the art that by combining the modes of operation presented above in different ways in connection with different embodiments of the invention, it is possible to provide various embodiments of the invention in accordance with the spirit of the invention. Therefore, the above-presented examples must not be interpreted as restrictive to the invention, but the embodiments of the invention can be freely varied within the scope of the invention.

In the drawings, only the parts and components important for understanding the principle of the invention are presented, and it is obvious that, for example, in order to adjust the temperature and pressure conditions of the reactor R, LR, as well as gas flows, certain components obvious to a man skilled in the art are required, but not shown in the figures.

The invention claimed is:

1. A method for the preparation of doped oxide material from a first reactant and a second reactant, said first reactant comprising silicon, and the second reactant comprising a rare earth metal, the method comprising:
   bringing said first reactant and said second reactant into a gas phase by heating said first reactant and said second reactant;
   mixing said first reactant and said second reactant together to create a gas flow; and
   mixing said gas flow with at least one oxidant gas to form particles by oxidizing silicon and said rare earth metal, and by condensing oxide vapors formed by said oxidizing, so that said oxide vapors reach a supersaturated state substantially simultaneously, wherein said particles are formed such that there is no time to reach a chemical phase equilibrium, and all substances present in said gas flow are substantially in the gas phase prior to said oxidizing, wherein one or more jets of said at least one oxidant gas are directed to said gas flow, and wherein said one or more jets of said at least one oxidant gas are transverse with respect to said gas flow.

2. The method according to claim 1, wherein said second reactant is in a liquid solution prior to said heating.

3. The method according to claim 1, wherein said rare earth metal is selected from a group consisting of erbium and neodymium.

4. The method according to claim 1, wherein said first reactant comprises a compound selected from a group consisting of silicon tetrachloride and tetraethylortosilicate.

5. The method according to claim 4, wherein said particles comprise an element selected from a group consisting of aluminium, phosphorus, boron, and fluorine.

6. A method for the preparation of doped oxide material from a first reactant and a second reactant, said first reactant comprising germanium, and the second reactant comprising a rare earth metal, the method comprising:
   bringing said reactants into a gas phase by heating said reactants;
   mixing said reactants together to create a gas flow; and
   mixing said gas flow with at least one oxidant gas to form particles by oxidizing germanium and said rare earth metal, and by condensing oxide vapors formed by said oxidizing, so that said oxide vapors reach a supersaturated state substantially simultaneously, wherein said particles are formed such that there is no time to reach a chemical phase equilibrium, and all substances present in said gas flow are substantially in the gas phase prior to said oxidizing, wherein one or more jets of said at least one oxidant gas are directed to said gas flow, and wherein said one or more jets of said at least one oxidant gas are transverse with respect to said gas flow.

7. The method according to claim 6, wherein said first reactant comprises a compound selected from a group consisting of germanium tetrachloride and tetraethoxygermanium.

8. A method for the preparation of doped oxide material from a first reactant and a second reactant, said first reactant comprising silicon, and the second reactant comprising a rare earth metal, the method comprising:
   bringing said first reactant and said second reactant into a gas phase by heating said first reactant and said second reactant;
   mixing said first reactant and said second reactant together to create a gas flow, wherein the gas flow is directed through a de Laval nozzle; and
   mixing said gas flow with at least one oxidant gas to form particles by oxidizing silicon and said rare earth metal, and by condensing oxide vapors formed by said oxidizing, so that said oxide vapors reach a supersaturated state substantially simultaneously, wherein said particles are formed such that there is no time to reach a chemical phase equilibrium, and wherein all substances present in said gas flow are substantially in the gas phase prior to said oxidizing.

9. The method according to claim 8, wherein one or more jets of the at least one oxidant gas are directed to the gas flow in a narrowest part of the de Laval nozzle.

10. A method for the preparation of doped oxide material from a first reactant and a second reactant, said first reactant comprising germanium, and the second reactant comprising a rare earth metal, the method comprising:
    bringing said reactants into a gas phase by heating said reactants;
    mixing said reactants together to create a gas flow, wherein the gas flow is directed through a de Laval nozzle; and
    mixing said gas flow with at least one oxidant gas to form particles by oxidizing germanium and said rare earth metal, and by condensing oxide vapors formed by said oxidizing, so that said oxide vapors reach a supersaturated state substantially simultaneously, wherein said particles are formed such that there is no time to reach a chemical phase equilibrium, and wherein all substances present in said gas flow are substantially in the gas phase prior to said oxidizing.

11. The method according to claim 10, wherein one or more jets of the at least one oxidant gas are directed to the gas flow in a narrowest part of the de Laval nozzle.

* * * * *

UNITED STATES PATENT AND TRADEMARK OFFICE
CERTIFICATE OF CORRECTION

PATENT NO. : 7,624,596 B2
APPLICATION NO. : 10/518006
DATED : December 1, 2009
INVENTOR(S) : Janka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 819 days.

Signed and Sealed this

Twenty-sixth Day of October, 2010

David J. Kappos
*Director of the United States Patent and Trademark Office*